United States Patent [19]
Koch et al.

[11] Patent Number: 5,954,876
[45] Date of Patent: Sep. 21, 1999

[54] APPARATUS FOR COATING FOODS, SUCH AS SWEETS, BAKED GOODS AND THE LIKE, WITH FLOWABLE COATING SUBSTANCES, SUCH AS CHOCOLATE AND OTHER ICINGS

[75] Inventors: Peter Koch, Pinneberg, Germany; Joost J. de Koomen, Mechanicsburg, Pa.

[73] Assignee: Hosokawa Kreuter GmbH, Hamburg, Germany

[21] Appl. No.: 09/072,106

[22] Filed: May 4, 1998

[30] Foreign Application Priority Data

May 6, 1997 [DE] Germany ............................ 197 24 641

[51] Int. Cl.[6] ....................................................... A23G 3/00
[52] U.S. Cl. ................................. 118/13; 118/31; 118/70; 118/324
[58] Field of Search ................................. 118/13, 31, 70, 118/324; 198/494, 498; 134/104.1, 104.3

[56] References Cited

U.S. PATENT DOCUMENTS

| | | | |
|---|---|---|---|
| 4,193,374 | 3/1980 | Mirza | 118/70 |
| 4,888,200 | 12/1989 | Milliken | 118/70 |
| 5,437,723 | 8/1995 | Sollich | 118/31 |

FOREIGN PATENT DOCUMENTS 2204775  11/1988  United Kingdom .

*Primary Examiner*—Laura Edwards
*Attorney, Agent, or Firm*—Friedrich Kueffner

[57] ABSTRACT

An apparatus for coating foods, such as sweets, baked goods and the like, with flowable coating substances, such as chocolate and other icings. The apparatus includes an endless conveyor belt for the coated goods or the goods to be coated and a run-off plate arranged underneath the conveyor belt for excess coating substance. A catch container is provided for receiving the excess coating substance from the run-off plate. A separate scraping belt for removing excess coating substance or scraping the run-off plate is provided underneath the conveyor belt and above the run-off plate.

4 Claims, 1 Drawing Sheet

Fig.1
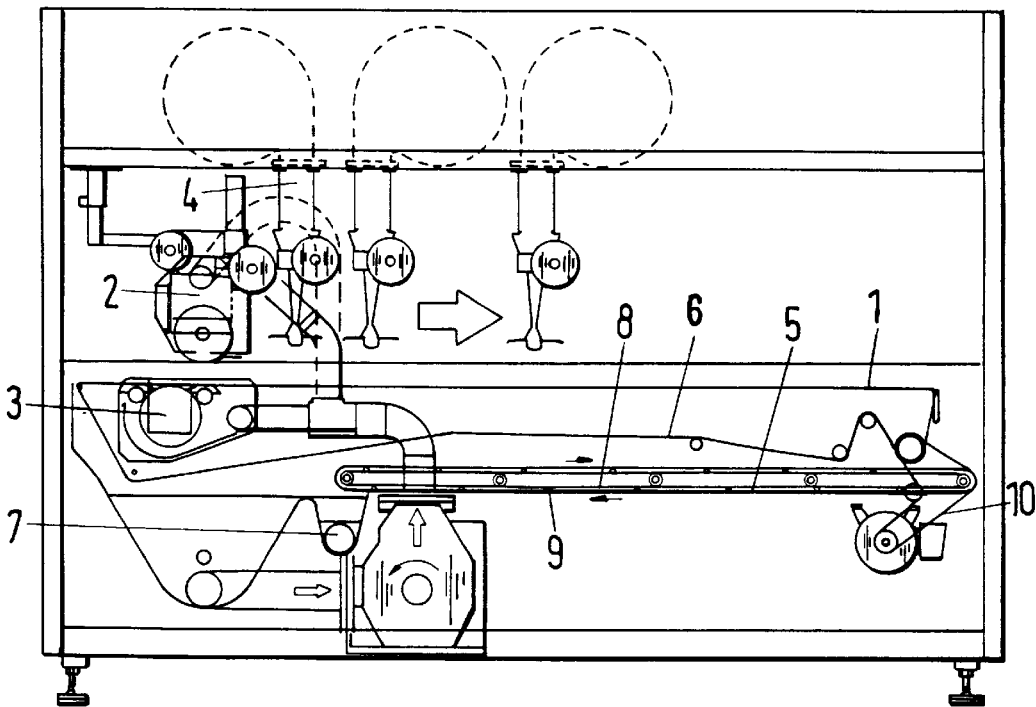
Fig.2
Fig.3
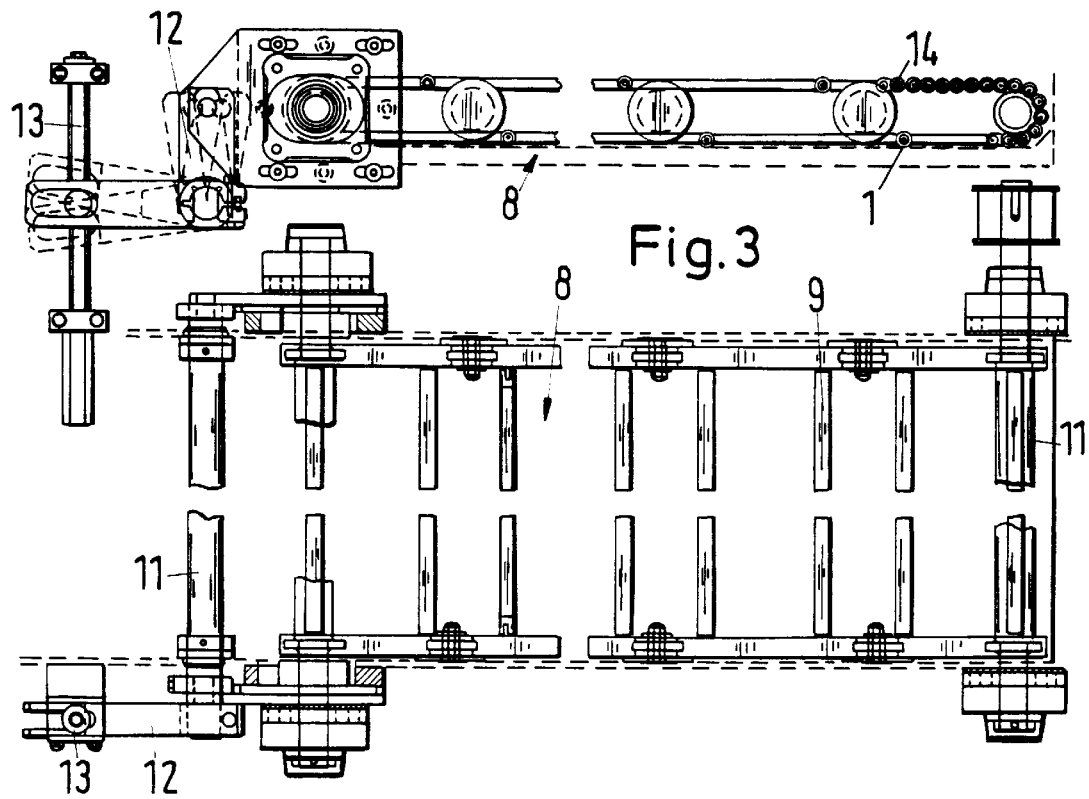

APPARATUS FOR COATING FOODS, SUCH AS SWEETS, BAKED GOODS AND THE LIKE, WITH FLOWABLE COATING SUBSTANCES, SUCH AS CHOCOLATE AND OTHER ICINGS

BACKGROUND OF THE INVENTION

1. Field of the Invention

The present invention relates to an apparatus for coating foods, such as sweets, baked goods and the like, with flowable coating substances, such as chocolate and other icings. The apparatus includes an endless conveyor belt for the coated goods or the goods to be coated and a run-off plate arranged underneath the conveyor belt for excess coating substance. A catch container is provided for receiving the excess coating substance from the run-off plate.

2. Description of the Related Art

Various constructions of the above-described apparatus are known in the art. They are also called coating or icing machines and are used in the production of bars, pralines, waffles, ice cream, sugar products, baked goods with long shelf lives or fine baked goods, snacks or also fat-free articles. The coating usually consists, for example, of chocolate, caramel, cocoa, icings, icings of shortening or sugar. The coating process is carried out in the liquid state. Following the coating process, the coating substance is cooled and dried to reach the solid state.

In the known apparatus of the above-described type, a conveyor belt is provided which is composed of a braided material or also of belts. Preferably, they are belts of rod braiding. Devices which apply the coating substance to the goods from above and below are arranged above and below the conveyor belt and, thus, above and below the goods to be coated. An excess amount of substance is applied, i.e., more substance is applied than is required for coating the goods. This excess coating substance then drops between the goods, or the coating substance is blown off. The excess substance is collected in a catch container and is returned to be reused. A slightly inclined run-off plate leads to the catch container.

The substances used for coating have the property that they easily solidify which is problematic for the continuous operation of the apparatus. In this particular field, this is called "build-up". This build-up must be prevented or kept within limits which do not impair the continuous operation. The run-off plates are arranged either vertically or inclined to such an extent that the coating substances can flow off by themselves as a result of gravity. Other run-off plates extend horizontally or only slightly inclined, so that the coating substance cannot flow off by itself without the help of appropriate devices.

In the known apparatus of the above-described type, the essentially horizontally extending or slightly inclined run-off plate is cleaned by the returning portion of the conveyor belt, i.e., the conveyor belt takes along the coating substance which has dropped down or has been blown off and moves it toward the catch container. Accordingly, the conveyor belts in these known apparatus are not only used for conveying the goods to be coated or the coated goods, but they also serve as cleaning belts for the run-off plate. This limits the service life of the conveyor belts. This constitutes a weak point because an appropriate maintenance or exchange of the damaged or torn conveyor belts are required. Since the wear of the conveyor belts should be kept as low as possible, this must also be taken into consideration when constructing the apparatus, i.e., at the ends of the conveyor belts where they are deflected, the deflecting radii should be as large as possible, so that the conveyor belts and their components are subjected to as little load as possible. However, this contradicts the requirement of transferring the goods at the beginning and the end of the conveyor belt without problems to other processing stations with other conveyor belts and picking up the goods by these other processing stations. The wires of the braided belt should be as thick as possible. However, this contradicts the requirements made with respect to the transfer, particularly in the case of short goods.

SUMMARY OF THE INVENTION

Therefore, it is the primary object of the present invention to provide an apparatus of the above-described type which overcomes the difficulties described above and has a conveyor belt with a service life which is as long as possible.

In accordance with the present invention, a separate scraping belt for removing excess coating substance or scraping the run-off plate is provided underneath the conveyor belt and above the run-off plate.

As a result of the fact that now a scraping belt is provided in addition to the conveyor belt, both belts can be constructed, dimensioned and guided in accordance with the tasks which they have to perform. The conveyor belt no longer has to be constructed in such a way that it also cleans the run-off plate. It can be designed solely to act as a conveyor belt. The cleaning task is taken over by the scraping belt which, in turn, is not used for conveying and, thus, can be constructed solely with respect to the task of moving and scraping the substance. This separation of tasks substantially increases the service life and the field of use of the apparatus. In the deflection area, the conveyor belt can also be constructed with a relatively small radius, since it no longer has to be constructed in such a way that it can also carry out a cleaning operation.

In accordance with an advantageous feature of the present invention, the scraping belt has a plurality of transverse struts.

In accordance with another feature, the transverse struts have a circular cross-section and the ends of the transverse struts are rotatably mounted in an endless chains. As a result, the transverse struts roll on the coating substance and move the coating substance in this manner. At the ends where the scraping belt is deflected, the struts are cleaned by making contact with the guide shafts.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic side view of an embodiment of the apparatus according to the present invention;

FIG. 2 is a side view showing an embodiment of the scraping conveyor; and

FIG. 3 is a top view of the scraping conveyor of FIG. 2.

DESCRIPTION OF THE PREFERRED EMBODIMENTS

The apparatus shown in FIG. 1, also called a coating machine, forms part of a total plant. Following in conveying direction are, for example, a cooling unit with an appropriate conveyor belt.

The apparatus shown in FIG. 1 has an endless conveyor belt 1 which conveys the objects to be coated through the apparatus and conveys the goods after they have been coated and transfers them to a cooling duct. Two coating stations 2 and 3 serve to coat the goods from above and below. Blowers 4 are provided to blow off excess coating substance.

A separate scraping belt 8 is arranged underneath the conveyor belt. The scraping belt 8 extends over a substantial portion of the conveying length of the conveyor belt. The scraping belt 8 travels immediately above a run-off plate 5 which is slightly inclined against the conveying direction. The direction of movement of the endless scraping belt 8 is indicated by arrows. The scraping belt 8 travels above the run-off plate 5 against the conveying direction of the conveyor belt 1, i.e., in the direction toward the catch container 7. The returning portion of the conveyor belt, designated by reference numeral 6, travels above the scraping belt 8. This return portion does not carry out any function in the production. When considering FIG. 1, it becomes apparent that the guide radii for the conveyor belt 1 at the beginning and the end are very small, because the conveyor belt can be constructed and dimensioned accordingly.

The conveyor belt 1 and the scraping belt 8 are driven by a common drive 10. The speeds of both belts are adjusted to each other in accordance with the production requirements.

FIGS. 2 and 3 show an embodiment of a scraping belt 8. The scraping belt 8 is formed by 2 endless chains 14, wherein transverse struts 9 are arranged between the chains 14. The transverse struts 9 can also be seen in FIG. 1. These transverse struts 9 are rotatably mounted in the chains, so that they roll during the movement on the run-off plate 5. They have a circular cross-section.

The guide shafts 11 are dimensioned in relation to the transverse struts 9 in such a way that the transverse struts 9 also roll on the guide shafts and are cleaned as a result.

The chains 14 can be tensioned by a tensioning unit which includes an angle-type lever 12 and an adjusting rod 13.

During production, the goods to be coated are supplied from the left hand side as shown in FIG. 1 and are then coated by the coating devices 2 and 3. Excess coating substance is blown off by the blowers 4 or drips down as a result of gravity either directly into the catch container or onto the run-off plate 5. Excess coating substance is moved from the run-off plate 5 by the scraping conveyor, i.e., by the lower portion of the scraping conveyor, into the catch container 7 and is then returned for reuse. The finished coated goods then travel from the conveyor belt 1, which is deflected over a relatively small radius, into a cooling device.

While specific embodiments of the invention have been shown and described in detail to illustrate the inventive principles, it will be understood that the invention may be embodied otherwise without departing from such principles.

We claim:

1. An apparatus for coating foods with flowable coating substances, the apparatus comprising an endless conveyor belt for conveying the foods to be coated or coated foods, means for coating the foods mounted at least one of above and below the conveyor belt, a run-off plate arranged underneath the conveyor belt for collecting excess coating substance, and a catch container for receiving excess substance from the run-off plate, further comprising a scraping belt arranged below the conveyor belt and above the run-off plate for moving the excess coating substance and for scraping the coating substance from the run-off plate, wherein the scraping belt comprises a plurality of transverse struts.

2. The apparatus according to claim 1, wherein the transverse struts have a circular cross-section, wherein ends of the transverse struts are rotatably mounted in endless chains.

3. The apparatus according to claim 2, further comprising guide shafts for the chains, wherein the transverse struts and the guide shafts for the chains are dimensioned such that the transverse struts are in contact with the guide shafts when the scraping belt is guided around the guide shafts in order to clean the transverse struts.

4. The apparatus according to claim 1, further comprising a common drive for the conveyor belt and the scraping belt.

* * * * *